United States Patent Office 3,415,939
Patented Dec. 10, 1968

3,415,939
MATTE COSMETIC CREAM COMPOSITION
Abraham Minton, Rego Park, N.Y., assignor to David Roberts, New York, N.Y.
No Drawing. Continuation-in-part of application Ser. No. 385,768, July 28, 1964. This application June 22, 1965, Ser. No. 466,054
2 Claims. (Cl. 424—357)

This invention relates to stable cosmetic preparations which, upon drying on the skin, impart thereto a durable matte appearance wherein a shiny appearance of the epidermis is avoided and prevented.

This application is a continuation-in-part of my application Ser. No. 385,768 filed July 28, 1964, now abandoned.

Prior cosmetic preparations, both of the powder and liquid character, used for avoiding a shiny appearance of the skin, have tended to rub off and peel, and, particularly in the case of liquid base preparations, have tended to make their presence on the skin apparent. The powder preparations have displayed the further disadvantage of being difficult to apply without scattering, and thereby creating an unsightly appearance on the user's clothing when the powder particles settled thereon. Some liquid base preparations were of such thin consistency that they tended to flow or run immediately upon application, thereby making their use more difficult. To overcome these difficulties, and to present improved ease and neatness of application, I have found particular combinations of materials and particular ranges of concentrations of these materials, which provide a liquid base product surprisingly effective for producing a pleasing matte appearance on the skin. This matte appearance freely blends with the skin texture, and does not result in a pronounced cosmetic appearance, i.e., the presence of my preparations on the skin is not evident to an observer.

Moreover, the liquid base products of my invention have the further desirable characteristics of being fast drying, stable in storage, easily and conveniently applied and, upon application and drying on the skin, being strongly adherent to the skin so that the matte effect is durable and persists. In addition, the products of my invention give a pleasant sensation on the skin, and do not cause a greasy or oily feeling.

Whereas the prior art liquid base cosmetic preparations frequently resulted in a product unstable during storage (i.e., one which separated into two phases on standing), my products are stable. Many in the prior are have sought to impart stability by using emulsifiers such as carboxymethyl cellulose (see Mehaffey, U.S. Patent No. 2,678,902). However, such materials produced an undesirable oily or tacky feel on the skin which persisted even after the product had dried thereon. In contrast, my products produce a desirable sensation when applied to the skin.

Many of the prior art cosmetic preparations have failed to adhere to the skin, and have rubbed off onto the users' clothing, thus creating an unsightly appearance thereon. In others, the powder layer left on the skin by the preparation failed to remain homogeneous and thus cracked or peeled after application. In the prior art, many have sought to overcome these disadvantages by the use of oily materials such as mineral oil, lanolin, or spermaceti which caused an unpleasant oily sensation when applied to the skin. But the products of my invention produce a pleasant non-oily sensation when applied, and the powder layer remaining on the skin after my products have dried thereon is highly adherent to the skin, and does not crack, peel, or rub off.

The preparations of my invention, as indicated above, are highly satisfactory liquid base cosmetic preparations, which prevent a shiny appearance of the skin, without making the presence of the preparation on the skin evident, and, in addition, are surprisingly stable, adherent, and cause a pleasant sensation when applied to the skin. To achieve these desirable characteristics, I employ a composition of matter comprising the following constituents, the ranges of which are given in terms of percent by weight of the total composition:

(1) 15% to 55% of a non-toxic lower alkyl alcohol;
(2) 0.5% to 6% of a higher fatty alcohol, having from 14 to 22 carbon atoms per molecule;
(3) 0.1% to about 2% of a non-toxic metal salt of an n-alkyl sulfate, having from 12 to 22 carbon atoms per molecule;
(4) 2% to 6% of a hydrophilic colloidal hydrous aluminum silicate; and
(5) Water.

These ingredients interact upon one another to form a product of surprising stability in view of the very high concentration of alcohol and water present in the formulation. Further, the concentrations of the ingredients may be varied, within the limits specified, to modify the consistency of the product from that of a flowable cream to that of a firm, substantially non-flowing paste, thereby permitting the consistency to be adjusted to the optimum level for the desired form of packaging and method of application.

The compositions of the invention are particularly useful as cosmetics. The compositions of the invention impart to the skin a pleasing matte appearance, without any "powdery" look, much more durable and adherent than the conventional face powders.

The compositions of the invention are also extremely effective electric-shaver pre-shave preparations allowing the electric razor to glide smoothly over the skin without the familiar but unpleasant pulling and dragging sensation. In addition, the compositions of the invention are useful as after-shave preparations, and as preparations adapted to remove the shine from bald heads or other shiny portions of the human skin. Furthermore, particularly where alcohol concentrations above about 30% are employed in the compositions of the invention, my compositions display pronounced astringency when applied to freshly-shaven skin.

Effective amounts of pigments and perfumes may be employed. Because of the high alcohol contents employable without instability in my compositions, dyes and pigments are more readily incorporated and more easily and uniformly dispersed therein. Other ingredients may also be added depending upon the end use envisaged. For example, where the product is intended for use as an after-shave preparation, an enhanced pleasant cooling effect can be obtained by incorporating small amounts of menthol. Materials such as aluminum chlorohydrate can also be added to increase astringency and to enhance styptic action; antiseptics such as p-chloro-m-cresol can also be added. The addition of these and similar materials is conventional and well known to those skilled in this art and, as such, is not a part of the invention, although such materials are advantageously incorporated therewith.

As used herein, the term non-toxic lower alkyl alcohols designates $C_2$ and $C_3$ alcohols, i.e., ethanol, isopropanol, n-propanol and mixtures thereof. Ethanol, where used, may be denatured with any of the conventional materials acceptable for use in cosmetics. Alcohols of higher molecular weight than the propanols are unsatisfactory for incorporation in my product in substantial amount. Concentrations of lower alkyl alcohols in excess of about 55% by weight should be avoided in order to maintain satisfactory stability in the product, but concentrations in excess of about 30% by weight are preferred where astringency is a desired characteristic. Lower alkyl alcohol concentrations in the range of from about 30% to about 50% by weight are preferred.

Typically suitable fatty alcohols are the n-aliphatic alcohols having from 14 to about 22 carbon atoms per molecule. For best results it is preferred that the fatty alcohol be soluble in an ethanol-water solution in order to facilitate manufacture of the product.

The concentration of fatty alcohol used in the formulation depends upon the alcohol's molecular weight and the product consistency desired. For a $C_{14}$ alcohol, as much as 6% by weight may be required to attain a product of thick non-flowing paste-like consistency while, for a $C_{22}$ alcohol, as little as 0.5% by weight would be adequate to produce the same product consistency. Generally, the thicker the consistency desired, the greater the concentration of fatty alcohol that would be employed.

Preferred fatty alcohols are cetyl alcohol and stearyl alcohol, as they are readily available and are comparatively inexpensive. Concentrations of about 1.5% to 3% of these preferred materials are generally employed. Mixtures of fatty alcohols can also be used.

Any non-toxic metal salt of an n-alkyl sulfate having from 12 to 22 carbon atoms per molecule can be used. Exemplary of suitable materials are the lithium, sodium, potassium, calcium and magnesium salts of the lauryl, myristyl, cetyl, stearyl and eicosyl sulfates. The quantity used is in excess of 0.1% by weight as use of lower concentrations tends to result in unstable products. Concentrations in excess of about 2% by weight are not normally used. The concentration of the alkyl sulfate used in the formation depends on its nature and upon the particular fatty alcohol employed. Where stearyl alcohol is used, about 0.5% of, for example, sodium myristyl sulfate would be adequate. As in the case of the fatty alcohol, mixtures of alkyl sulfates can be used.

The hydrophilic colloidal hydrous aluminum silicates are generally characterized by the property of further hydrating and swelling in water and ultimately forming a slurry or gel. Illustrative of these colloidal hydrous aluminum silicates are the montmorillonite clays such as bentonite or treated bentonites, hydrophilic colloidal magnesium aluminum silicates which may also contain adsorbed exchangeable metal cations, particularly alkali and alkaline earth metal cations, and which may contain adsorbed exchangeable non-toxic, non-irritant hydrophilic organic cations, particularly alkyl-ammonium, hydroxyalkyl ammonium as, for example, the tris (hydroxyethyl) methyl ammonium cation and quaternary ammonium cations.

A commercially available colloidal magnesium aluminum silicate containing adsorbed exchangeable alkali metal and alkaline earth metal cations is sold under the trademark "Veegum" and a commercially available colloidal magnesium aluminum silicate containing adsorbed exchangeable hydroxyalkyl ammonium cations is sold under the trademark "Veegum-Pro." Veegum is a standard item of commerce. It is sold under that tradename by the R. T. Vanderbilt Company, Inc., New York, N.Y., and its preparation is described in U.S. Patent No. 2,523,204. The chemical analysis of Veegum, expressed as oxides, is as follows:

| | |
|---|---|
| Silicon dioxide | 61.1 |
| Magnesium oxide | 13.7 |
| Aluminum oxide | 9.3 |
| Titanium dioxide | 0.1 |
| Ferric oxide | 0.9 |
| Calcium oxide | 2.7 |
| Sodium oxide | 2.9 |
| Potassium oxide | 0.3 |
| Carbon dioxide | 1.8 |
| Water of combination | 7.2 |

Veegum-Pro, is likewise a standard item of commerce marketed by R. T. Vanderbilt Company, Inc. It differs from other grades of Veegum in that it contains tris(hydroxyethyl) methyl ammonium cations.

Where concentrations of lower alkyl alcohol in excess of about 40% by weight are employed, I prefer to employ a hydrophilic colloidal magnesium aluminum silicate containing adsorbed exchangeable organic cations, particularly hydroxyalkylammonium cations in production of a product having a substantially non-flowing paste consistency.

Sufficient colloid is used to permit obtaining the desired consistency. This will usually be in excess of 3½%, where a thick flowable cream or substantially non-flowing paste is desired. Produces having between 2% and about 4% of colloid while viscous, flow readily. The exact amount of colloid required to obtain, a given consistency depends on the amount of lower alkyl alcohol and on the nature and amount of the fatty alcohol used, since these components also have a pronounced effect on product consistency. The method of preparing the compositions also affects product consistency as will be subsequently described.

The following procedures for preparation of products of my invention are presented as illustrative. Other methods will occur to those skilled in the art.

In a typical procedure for preparing flowable products, the fatty alcohol is first heated to its melting point, whereupon the lower alkyl alcohol is added. The mixture is agitated to complete dissolution of the fatty alcohol in the lower alkyl alcohol. The alkyl sulfate is then added and stirring is continued until the sulfate has dissolved. The hydrophilic colloidal hydrous aluminum silicate is then added and the mixture is agitated until the colloid is uniformly dispersed. After a uniform dispersion is obtained, water, warmed to a temperature above about 40° C. is added, thereby increasing the temperature of the mixture. The mixture is maintained at this increased temperature level and agitation is continued until a homogeneous dispersion is obtained. Obtention of a homogenous dispersion is evidenced by an increase in consistency. After the homogeneous dispersion is obtained, heating and stirring may be discontinued and the mixture can then be allowed to cool.

In the above procedure, the hydrous aluminum silicate is added to the alcohol. The presence of the alcohol inhibits further hydration of the aluminum silicate when the water is added though it does not prevent it altogether. For a given formulation, the greater the degree of hydration of the hydrous colloidal aluminum silicate, the thicker will be the consistency of the product. Thus, it will be apparent that this method results in a somewhat thinner product than would be obtained were the hydrous colloidal aluminum silicate fully hydrated before being admixed with the alcohol.

Thus, where products of thicker consistency, e.g., non-flowing pastes, are desired, the hydrophilic colloidal hydrous aluminum silicate may first be dispersed in warm water with agitation sufficient to obtain a uniform dispersion thereby permitting the hydrous aluminum silicate to become fully hydrated. After a uniform dispersion is obtained, a solution of the alkyl sulfate and the fatty alcohol in the lower alkyl alcohol is added. As above, heating the agitation are continued until a uniform dispersion is obtained, after which heating and agitation are discontinued and the product is allowed to cool.

Product consistency is also affected by the extent and duration of agitation and by the nature of the hydrous aluminum silicate employed. For example, a non-flowing paste can be obtained even though the hydrous aluminum silicate is added to the lower alkyl alcohol before water is added; however, extended agitation employing high rates of shear such as that obtainable by mixing the ingredients in a "Waring Blendor" for 20–30 minutes or more is normally required in such cases. Intensity or rigor of the mixing may often be reduced somewhat when an organic cation-containing hydrous aluminum silicate is employed since such silicates are more susceptible to further hydration in an alcohol-water medium than those hydrous colloidal aluminum silicates containing no organic cation.

The following examples, in which all parts are by weight unless otherwise indicated, are intended to illustrate but not to limit my invention.

Example 1

657 parts of water are added to a jacketed stainless steel vessel equipped with an agitator. The water is heated and maintained within the range of from about 50° C. to about 55° C. and agitation is commenced. 1.0 parts of titanium dioxide and 0.3 part of other pigments are then added and uniformly dispersed in the water. Next, 42 parts of colloidal magnesium aluminum silicate (Veegum) are quickly added, and agitation is is continued until a uniform dispersion of the colloid in the water is obtained. Obtention of a uniform dispersion is evidenced by a change in the character of the suspension from a relatively fluid material to a comparatively thick cream. In this example the uniform dispersion is obtained in approximately 10 to 15 minutes. More efficient agitation would decrease this time and, conversely, less efficient agitation would substantially increase it.

20 parts of stearyl alcohol and 1.0 part of menthanol are added to a second jacketed stainless steel vessel, also equipped with an agitator, and heated with agitation until they melt. Heating is then discontinued. 245 parts of denatured ethanol (Formula S.D. No. 40) are added and agitation continued until a solution is obtained. 5.0 parts of sodium myristyl sulfate are then added and agitation continued until the sulfate dissolves. When a solution is obtained, the aqueous suspension of the hydrous colloidal magnesium aluminum silicate, prepared as described above, is added and agitation is continued for fifteen minutes, whereupon a product of the desired thick paste-like consistency is obtained. Agitation is then stopped and cold water is passed through the jacket to cool the product. The product obtained after cooling is a firm non-flowing paste having a consistency like that of cold cream and is suitable for packaging in, for example, collapsible tubes.

A portion of the product of this example, after application to the skin by rubbing it over the surface thereof, quickly dries, leaving a thin homogenous adherent powder layer on the skin. After drying, the skin has a non-shiny dull appearance, but the presence of this powder layer is not otherwise apparent. This matte appearance persists for several hours without cracking, peeling, or rubbing off of the powder layer. During application, the product creates a pleasant sensation on the skin and, after drying, the presence of the preparation on the skin is not felt by the user.

Example 2

20 parts of stearyl alcohol and 1.0 part of menthol are melted in a jacketed stainless steel kettle fitted with an agitator. Heating is then discontinued and 245 parts of 95% denatured ethanol (S.D. Formula No. 40) are added to dissolve and cool the melt which is still warm enough after the solution is obtained to maintain the fatty alcohol and menthol in solution. 5.0 parts of sodium myristyl sulfate is then added with agitation to disperse it uniformly throughout the solution to facilitate its dissolution. 2.5 parts of perfume are also added. 43 parts of colloidal magnesium aluminum silicate and 1.3 parts of titanium dioxide and other pigments are then added to the alcohol solution and dispersed therein. 650 parts of water, heated to between 45° C. and 50° C. are then added quickly to the alcohol-hydrous aluminum silicate dispersion which is being vigorously agitated during this addition Agitation is continued for fifteen minutes thereafter with the speed of the agitator being increased as necessary to maintain the fluid in motion. At the end of this period the batch is then cooled by passing cold water through the jacket. The product thus obtained is a thick creamy material displaying a slight flow and is suitable for packaging in, for example, plastic squeeze bottles.

A portion of the product of this example, after application to the skin quickly dries, appearing to vanish, but leaving a thin continuous adherent powder layer on the skin. The pleasing matte appearance of the skin thereby produced persists for more than twelve hours and the powder layer does not scale or peel off or crack with flexing of the skin. During application, the product creates a pleasant sensation on the skin and, after drying, the presence of the preparation on the skin is not felt by the user.

While the product of this example contains a slightly greater proportion of the hydrous aluminum silicate than the product of Example 1, it is actually more fluid, thus illustrating the effect of the degree of the hydration of the hydrous aluminum silicate on product consistency.

A similar product may be produced employing as much as 480 parts of denatured ethanol in lieu of the 245 parts of the above example and when, after addition of the water in correspondingly reduced amount (about 400 to 450 parts of water), violent agitation, particularly under conditions of high shear such as is effected in a blendor type mixer, is continued for about 24–45 minutes to secure the fullest development of the hydration of the colloidal magnesium silicate. Full development of hydration will be indicated when, under additional violent agitation for three minutes, there is no substantial increase in viscosity, viscosity being measured employing a Brookfield viscometer.

Even greater quantities of lower alkyl alcohol can be employed. A product having the consistency of a paste may be prepared using even larger proportions of denatured ethanol. Hydrophilic colloidal hydrous magnesium aluminum silicate containing an adsorbed exchangeable hydroxyalkylammonium cation (e.g., "Veegum-Pro") is particularly effective with the larger amounts of alcohol.

Example 3

A portion of the product of Example 1 is stored in a tightly closed glass jar for more than a year at normal room temperature. At the end of this period the product retains its original consistency and appearance. No separation of phases has occurred. A portion of this product, upon application to the skin, continues to display the characteristics of the product of Example 1.

Example 4

A product having the following formulation was prepared in accordance with the procedure of Example 2:

| | Parts by weight |
|---|---|
| Isopropanol | 15.0 |
| Cetyl alcohol | 3.2 |
| Lithium eicosyl sulfate | 1.0 |
| Bentonite (colloidal) | 5.3 |
| Water | 76.8 |
| Perfumes, pigments, antiseptics, etc. | q.s. |

The product of this example, like that of Example 1, is a firm paste, suitable for packaging in collapsible tubes.

A portion of the product of this example, after application to the skin quickly dries, leaving a thin homogeneous adherent powder layer on the skin. After drying, the skin has a non-shiny dull appearance, but the presence of this powder layer is not otherwise apparent. This matte appearance persists for several hours without cracking, peeling, or rubbing off of the powder layer. During application, the product creates a pleasant sensation on the skin and, after drying, the presence of the preparation on the skin is not felt by the user.

Example 5

A product having the following formulation was prepared in accordance with the procedure of Example 2:

| | Parts by weight |
|---|---|
| 95% ethanol (S.D.A. Formula 40) | 40.0 |
| Docosyl alcohol | 0.8 |
| Potassium lauryl sulfate | 0.5 |
| Colloidal magnesium aluminum silicate | 4.2 |
| Water | 54.5 |
| Perfumes, pigments, antiseptics, etc. | q.s. |

The product is a thick cream, having a slight flow, and is suitable for packaging in, for example, plastic squeeze bottles.

A portion of the product of this example, after application to the skin and dispersion over the surface thereof, quickly dries. The preparation upon drying leaves a thin homogeneous adherent powder layer on the skin thereby producing a non-shiny dull appearance thereupon but the presence of this powder layer is not otherwise apparent. This pleasing matte appearance of the skin persists for several hours during which time the powder layer does not crack, scale or peel as the skin flexes. During application, the product creates a pleasant sensation on the skin and, after drying, the presence of the preparation on the skin is not felt by the user.

Example 6

A product having the following formulation was prepared in accordance with the procedure of Example 2:

| | Parts by weight |
|---|---|
| Ethanol | 35.0 |
| Myristyl alcohol | 3.0 |
| Calcium stearyl sulfate | 1.0 |
| Colloidal magnesium aluminum silicate (Veegum) | 2.5 |
| Water | 58.5 |
| Perfumes, pigments, antiseptics, etc. | q.s. |

The product of this example is a relatively thin cream which flows readily. Upon application of the product of this example to the skin, the same characteristics are displayed as in the products of the other examples.

The products may be packaged in any convenient manner for products of similar consistency known to those skilled in the art. Plastic squeeze bottles, for example, are quite satisfactory where the products are in the form of flowable creams. Collapsible tubes or wide mouth jars are suitable where the products are in the form of pastes displaying little or no flow. The consistency of the product can be adjusted to particularly suit the packaging method chosen by modifying the concentration of fatty alcohol and/or its molecular weight and/or the concentration, type and degree of hydration of the hydrophilic colloidal hydrous aluminum silicate used. The manner of such adjustments is described above and is illustrated in the examples.

It will thus be seen that the compositions of my invention overcome the disadvantages of the prior art materials and, since certain changes may be made in the above composition of matter without departing from the scope of the invention, it is intended that all matter contained in the above description shall be interpreted as illustrative and not in a limiting sense.

Having described my invention, what I claim as new and desire to secure by Letters Patent is:

1. A cosmetic preparation in the form of a non-flowable cream which when applied to the skin provides thereon a thin, durable, adherent matte film, said preparation comprising from about 30 to about 55% of an alcohol selected from the group consisting of ethyl, propyl and isopropyl alcohols, from about 0.5 to about 6% of a higher fatty alcohol having from 14 to 22 carbon atoms per molecule, from about 0.1 to about 2% of a compound selected from the group consisting of non-toxic alkali and alkaline earth metal salts of n-alkyl sulfates having from 12 to 22 carbon atoms per molecule, from about 2% to about 6% of a hydrophilic colloidal hydrous complex magnesium aluminum silicate containing adsorbed tris(hydroxyethyl) methyl ammonium cation and water.

2. A cosmetic preparation in accordance with claim 1 wherein the alkyl sulfate is selected from the group consisting of sodium stearyl sulfate, sodium cetyl sulfate, and sodium myristyl sulfate and wherein the fatty alcohol is selected from the group consisting of stearyl alcohol, cetyl alcohol and myristyl alcohol.

References Cited

UNITED STATES PATENTS

| | | | |
|---|---|---|---|
| 2,380,011 | 7/1945 | Baker et al. | 167—93 XR |
| 2,523,204 | 9/1950 | Feustel et al. | |
| 2,898,269 | 8/1959 | Felletschin | 167—90 |
| 2,948,686 | 8/1960 | Gianladis | 252—153 |

OTHER REFERENCES

Reinisch et al., Journ. of the Soc. of Cosmetic Chemists, November 1959, vol. 5, No. 3, pp. 169–178 (pp. 170–174 relied on).

Sagarin, Cosmetics Science and Technology, September 1957, pp. 266–269, 434–436, 438–443, 445–455.

ALBERT T. MEYERS, *Primary Examiner.*

D. R. MAHANAND, *Assistant Examiner.*

U.S. Cl. X.R.

424—358

UNITED STATES PATENT OFFICE
CERTIFICATE OF CORRECTION

Patent No. 3,415,939

December 10, 1968

Abraham Minton

It is certified that error appears in the above identified patent and that said Letters Patent are hereby corrected as shown below:

Column 3, line 35, "formation" should read -- formulation -- Column 4, line 15, "Produces" should read -- Products --. Column 5, line 28, "menthanol" should read -- menthol --; line 74, after "addition" insert a period. Column 6, line 30, "24" should read -- 25 --.

Signed and sealed this 10th day of March 1970.

(SEAL)
Attest:

Edward M. Fletcher, Jr.
Attesting Officer

WILLIAM E. SCHUYLER, JR.
Commissioner of Patents